United States Patent [19]

Johnson

[11] Patent Number: 5,734,640
[45] Date of Patent: Mar. 31, 1998

[54] PROTECTION NETWORK DESIGN

[75] Inventor: David Johnson, Suffolk, United Kingdom

[73] Assignee: British Telecommunications public limited company, London, England

[21] Appl. No.: 604,954

[22] PCT Filed: Oct. 7, 1994

[86] PCT No.: PCT/GB94/02190

§ 371 Date: Feb. 28, 1996

§ 102(e) Date: Feb. 28, 1996

[87] PCT Pub. No.: WO95/10149

PCT Pub. Date: Apr. 13, 1995

[30] Foreign Application Priority Data

Oct. 7, 1993 [GB] United Kingdom ............... 9320641
Apr. 14, 1994 [EP] European Pat. Off. ........... 94302673

[51] Int. Cl.[6] ............................................. H04J 1/16
[52] U.S. Cl. ............................................. 370/228; 370/256
[58] Field of Search ............................ 370/216, 217, 370/218, 219, 220, 221, 222, 225, 226, 227, 228, 248, 242, 245, 247, 250, 251, 252, 253, 254, 255, 256, 444, 443, 445; 395/182.02; 379/221; 340/827, 825.01, 825.02, 825.03, 825.5, 825.51

[56] References Cited

U.S. PATENT DOCUMENTS 5,079,760  1/1992  Nemirowski et al. ................. 370/238
5,495,471  2/1996  Chow et al. ........................... 370/221
5,581,543  12/1996 Natarajan .............................. 370/221

OTHER PUBLICATIONS

"Near Optimal Spare Capacity Planning in a Mesh Restorable Network", Grover et al., Dec. 1991, pp. 2007–2010.

Primary Examiner—Dang Ton
Attorney, Agent, or Firm—Nixon & Vanderhye P.C.

[57] ABSTRACT

A communications network protection design method notionally adds a spare to the network for a simulated span failure and the respective values for network restorability merit, (taking into account span length or cost) are calculated. The notionally added spare having the greatest value of restorability merit is added to the network design and the process repeated, being extended to add two spares at a time if need be, and finally to add a complete path of spares to restore a failed span. The process ends after any addition of a spare or spares for which a network restorability target is reached. Following this forward synthesis phase, a tightening phase reduces the network cost by trying to remove spares and checking whether the restorability target can still be met. When no further single spares can be removed without violating the restorability target, this phase proceeds through various combinations namely; removing one spare and adding one spare; removing two spares and adding one or two spares; and removing three spares and adding two or three spares. Each such combination is accepted only if it will reduce the network cost.

11 Claims, 3 Drawing Sheets

Fig.5.

| SUBSPAN | COST/LINK | WORKERS | SPARES 3 HOP | SPARES 4 HOP | SPARES 5 HOP |
|---------|-----------|---------|--------------|--------------|--------------|
| 0 | 600 | 8 | 6 | 6 | 6 |
| 1 | 700 | 6 | 8 | 8 | 8 |
| 2 | 450 | 7 | 8 | 5 | 1 |
| 3 | 2240 | 4 | 5 | 6 | 8 |
| 4 | 2240 | 6 | 4 | 3 | 1 |
| 5 | 2645 | 4 | 3 | 4 | 2 |
| 6 | 2470 | 2 | 6 | 3 | 5 |
| 7 | 2070 | 0 | 0 | 2 | 2 |
| 8 | 240 | 9 | 1 | 1 | 5 |
| 9 | 540 | 2 | 2 | 2 | 2 |
| 10 | 250 | 2 | 0 | 0 | 0 |
| 11 | 225 | 3 | 6 | 4 | 5 |
| 12 | 225 | 3 | 0 | 0 | 0 |
| 13 | 425 | 1 | 0 | 0 | 0 |
| 14 | 300 | 3 | 5 | 5 | 3 |
| 15 | 2625 | 3 | 4 | 4 | 2 |
| 16 | 492 | 5 | 3 | 2 | 0 |
| 17 | 1480 | 2 | 3 | 2 | 1 |
| 18 | 320 | 4 | 2 | 3 | 2 |
| 19 | 420 | 6 | 0 | 0 | 0 |
| 20 | 435 | 2 | 1 | 2 | 2 |
| 21 | 335 | 4 | 4 | 0 | 0 |
| 22 | 210 | 4 | 4 | 1 | 2 |
| 23 | 400 | 3 | 1 | 1 | 2 |
| 24 | 410 | 5 | 3 | 3 | 3 |
| 25 | 3075 | 3 | 0 | 0 | 2 |
| 26 | 360 | 2 | 2 | 0 | 0 |
| 27 | 390 | 2 | 2 | 3 | 4 |

Fig.6.

| MAX HOPS | No.SPARES | COST | RUN TIME |
|----------|-----------|------|----------|
| 3 | 63 | 82686 | 29s |
| 4 | 70 | 76744 | 59s |
| 5 | 68 | 74295 | 86s |

PROTECTION NETWORK DESIGN

BACKGROUND OF THE INVENTION

1. Field of the Invention

This invention relates to a method of allocating spare capacity in a fully or partly meshed communications network.

2. Related Art

It is known from the paper "Near Optimal Spare Capacity Planning in a Mesh Restorable Network", W. D. Grover et al., Proc. IEEE Global Conference on Communications, Phoenix, Ariz., USA, 1991, pp 2007–2012 to allocate spare capacity in a communications network, i.e. the disposition of the spares by a two phase method in which spares are progressively added in the first phase to achieve a desired restorability target (the Forward Synthesis phase), and the second phase removes redundant spares without violating the restorability target (Tightening phase). In the known allocation method, in the forward synthesis phase each step which adds a notional spare or spares computes the respective network restorability and designates the spare or spares which produce the greatest increase in network restorability.

SUMMARY OF THE INVENTION

According to the present invention there is provided a method of allocating spare capacity in a communications network comprising a fully or partly meshed arrangement of connected nodes, the method comprising the steps of (a) selecting a span of the network; and (b) calculating the network restorability corresponding to the addition of a notional spare link to the selected span, the method being characterised by the further steps of:

(c) calculating the corresponding network restorability merit;

(d) repeating steps (a), (b) and (c) for other spans, there being no more than one notional spare link added to the network at any one time;

(e) if step (d) produces at least one notional spare link which increases network restorability, choosing the respective notional spare link giving the greatest value of network restorability merit;

(f) designating such chosen notional spare link as an actual spare link of the network; and (g) repeating steps (a) to (f) until a desired value of network restorability has been reached, or until step (d) fails to produce a notional spare link which increases network restorability.

The term network restorability merit as used herein means the network restorability value for money. In some embodiments of the invention, this may be expressed in the form of network restorability divided by protection network cost, i.e. the actual restorability value for a notionally added spare link divided by the total cost of the protection network (the cost of all the actual spare links of the network together with the cost of the notional spare link). In other embodiments of the invention, this may be expressed in the form of the increase in network restorability due to a notionally added spare link divided by the cost of the notionally added spare link.

Preferably there are included the modifications that in step (b) multiple-failure network restorability is calculated instead of network restorability, and that step (b) comprises the substeps of selecting groups of two or more spans, and for each group ranking the spans of a group in order of priority, notionally failing the spans of a group simultaneously, and resolving any contention for spare capacity by the spans of a group on the basis of their relative priorities.

More preferably, if step (d) fails to produce a single notional spare link which increases network restorability, modified steps (a) to (f) are performed in which the selected span and associated notional spare link are replaced by a pair of spans and respective notional spare links; on each occasion that modified step (f) designates a pair of notional spare links as actual spare links of the network, original steps (a) to (g) are performed; and on each occasions that modified step (d) fails to produce a pair of notional spare links which give an increase in network restorability, there are included the steps of (h) randomly choosing a span which is not yet fully restorable, and (i) adding, as actual spare links of the network, a sequence of spare links as a restoration route for the randomly chosen span.

The term route as used herein means a sequence of spans between two nodes and includes both complete end-to-end paths in the network as well as partial paths.

In a method arranged to simulate failure of a plurality of spans, and being arranged to add the sequence to spare links to the network there is preferably included, before adding the sequence of spare links to the network, the step of checking that each of the sequence of spare links is not associated with one of the plurality of selected spans whereby the restoration route does not fail in the event that the plurality of spans fan simultaneously.

Alternatively or additionally, there may be included, before adding the sequence of spare links to the network, the step of checking that each of the sequence of spare links will not form part of a restoration route for a span of higher priority.

In order that a network designed to have protection sufficient to cope with a failed node, preferably the concept of failing a plurality of spans includes the steps of storing for each node the identities of the routes associated therewith, notionally failing a node by selecting as a said group of spans all the spans associated with the notionally failed node, and determining multiple-failure span restorability for the notionally failed node.

In preferred methods of the present invention the tightening phase includes the steps of (j) notionally removing n spare links and adding m spare links, where n is a positive integer and m is zero or a positive integer, provided that this reduces the cost of the network (k) calculating the corresponding network restorability, (l) designating the or each notionally removed spare link and any notionally added spare link as an actually removed spare link and an actually added spare link, respectively, if the network restorability does not fall below the desired value, and repeating steps (j) to (l) until a desired criterion has been reached.

Where a span comprises a plurality of subspans, which can fail independently of each other, there may be included the step of designating a respective notional intermediate node for each subspan other than a first of the plurality of subspans. Alternatively, there may be included the step of designating a respective notional intermediate node for each subspan.

Because there is some variation in the meanings of terms used in the art, the following terms as used in this application will now be defined. A node is a cross-connect switch (CCS) or an add/drop multiplexer (ADM). A link is a block of bidirectional traffic capacity, e.g. a single line system or bearer, and corresponding to the switching granularity of the CCSs and ADMs. A span is the set of all links which directly connect a pair of nodes, i.e. there being no intermediate nodes. A subspan is a subset of all links which directly connect a pair of nodes, and a link can appear in only one subspan. A path is an end-to-end combination of links through the network. A worker is a link which is carrying traffic. A spare is a link which does not normally carry traffic and can be used for restoration in the event of a worker failing. A spare is also known as a protection link. Span restorability is the proportion of traffic capacity which can be restored on protection links if the span is severed. Network restorability or span-cut restorability of a network is the weighted average of the span restorabilities in the network. Multiple-failure span restorability is the proportion of traffic capacity which can be restored on protection links if a group of two or more spans fail simultaneously, a multiple-failure network restorability is the weighted average of the multiple-failure span restorabilities of a set of such groups.

BRIEF DESCRIPTION OF THE DRAWINGS

Preferred embodiments of methods of allocating spare capacity in accordance with the present invention will now be described with reference to the drawings in which:

FIG. 5 shows a table of the spare allocation produced by a method of the present invention for the network of FIG. 4; and FIG. 6 shows a table of the number of allocated spares in the network of FIG. 4, the cost of the allocated spares, and the run time of the method used, for different values of maximum hop.

DETAILED DESCRIPTION OF EXEMPLARY EMBODIMENTS

A method of allocating spare capacity in a communications network in accordance with the present invention is performed by a suitably programmed processor residing in a network management centre and storing information relating to the nodes of a network and a list of workers between the nodes. At the start of a forward synthesis phase shown as a flow chart in FIG. 1, the processor in step 10 determines whether the network restorability target has been reached, and if the answer is "no" moves to step 12 which selects each of the spans in turn and for each span notionally adds a spare and computes a respective value for "network restorability merit" which is defined as mentioned above as the increase in network restorability due to the notionally added spare divided by the cost of the notionally added spare.

The processor in step 12 selects the notionally added spare corresponding to the highest value of network restorability merit and enters details of the selected notionally added spare into its store, designating that spare as an actual spare of the network. It will be appreciated that this spare may not be physically present at this time but the processor will continue as if it were.

The processor now returns to step 10 to determine whether with the newly added spare the restorability target has been reached. The forward synthesis phase ends when the desired restorability target has been reached.

Assuming now that the target has not been reached, step 10 repeatedly causes step 12 to be executed until there cannot be found any one notionally added spare which increases the network restorability. If the target has still not been reached, the processor proceeds to step 14 which is similar to step 12 but instead of adding a single notional spare, adds two notional spares and proceeds to select a pair corresponding to the greatest value of network restorability merit.

Figure 1:
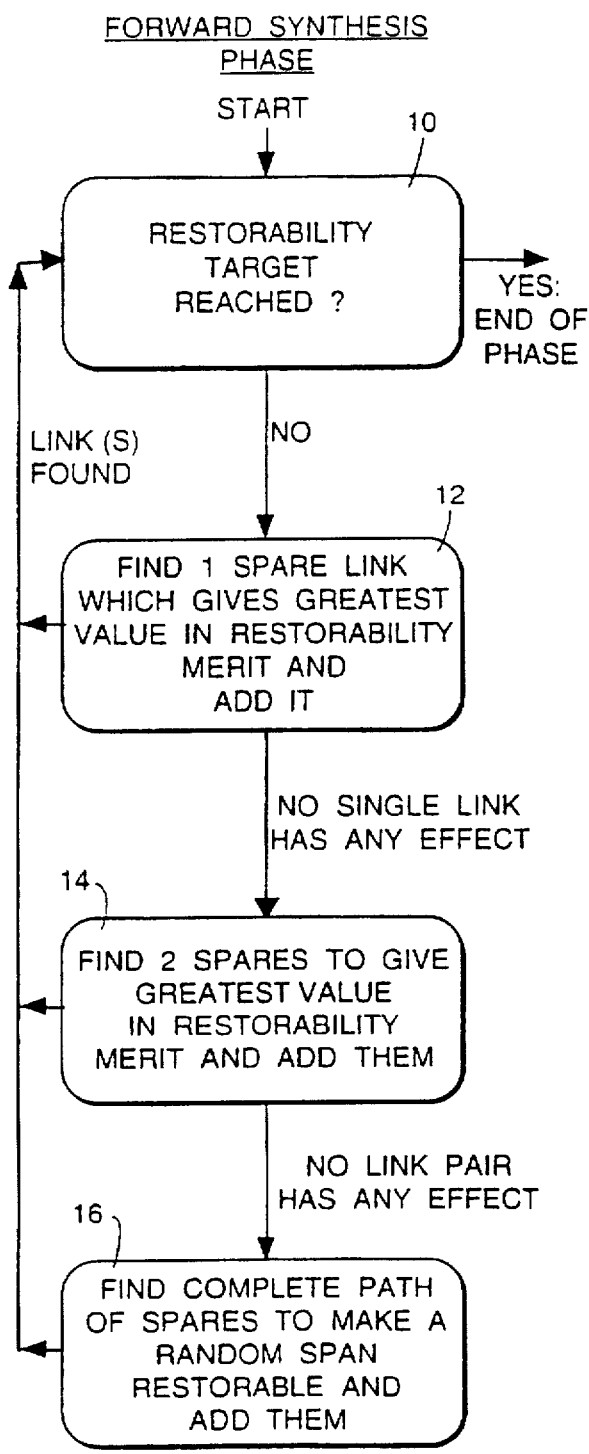
FIG. 1 shows a flow chart of a forward synthesis phase used in a method of the present invention.

If the target has still not been reached, step 14 ends when no notionally added pair of spares increases the restorability and the process proceeds to step 16 which randomly selects a span which is not yet fully restorable and adds a complete path of notional spares to restore the randomly selected span, again designating the notionally added spares as actual spares of the network. As shown in FIG. 1, step 14, when successful, returns to step 10 to determine whether the network restorability target has been reached after the addition of the spares to the network, and the phase proceeds to step 12 to see if a single spare link can now be added, and step 16, when successful, returns to step 10 to determine whether the network restorability target has been reached after the addition of the spares to the network, and the phase proceeds to step 12 to see if a single spare link can now be added and step 14 to see if a two spare links can now be added.

Figure 2:
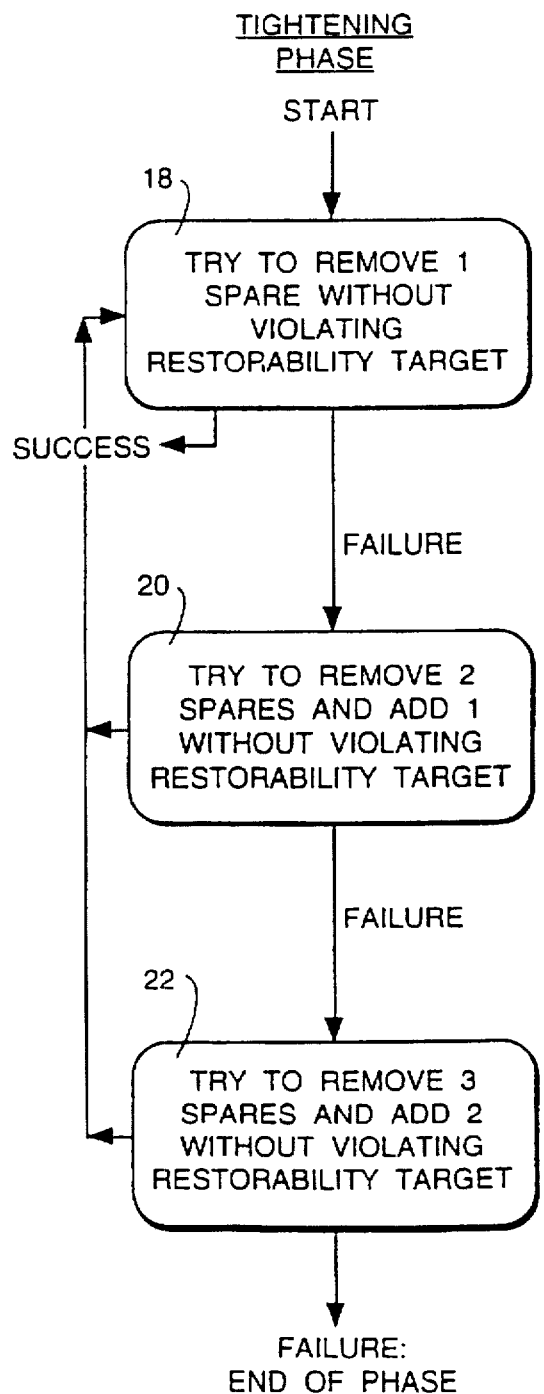
FIG. 2 shows a flow chart of a tightening phase used in a method of the present invention.

When the network restorability target has been reached, the forward synthesis phase ends and a tightening phase shown in FIG. 2 now starts. The processor in step 18 selects one of the spares of the network, temporarily cancels the designation of that spare as an actual spare of the network, i.e. notionally removes the spare from the network, and tests whether notionally failing any of the spans would produce a network restorability less that the target value i.e. violate the target.

If step 18 is successful in removing a spare without violating the restorability target, the processor continues step 18 iteratively until there is no single spare which can be removed without violating the restorability target, at which point the processor moves to step 20 which is similar to step 18 but which instead tries to remove two spares and add one spare without violating the restorability target. Similarly, when step 20 ceases to have any further effect, the process moves to step 22 which tries to remove three spares and add two spares violating the restorability target. The tightening phase ends when step 22 ceases to have any success. Each time that step 20 and step 22 is successful, the tightening phase returns to step 18.

In alternative arrangements of the present invention, step 20 deletes one spare and adds one spare subject to the network restorability target still being met and the network cost being reduced. In other words, the cost of the added spare is less than that of the deleted spare. Similarly in such arrangements, step 22 is modified to add two spares and delete two spares. If required, further steps may be included, for example adding three spares and deleting three spares, at all times subject to the restorability target being met and the network cost being reduced. Where a plurality of spares are added, the deletion of spares is performed one at a time and a check is performed at each deletion to see whether the target is still met. If the target is not met then no further spares are deleted.

Figure 3:
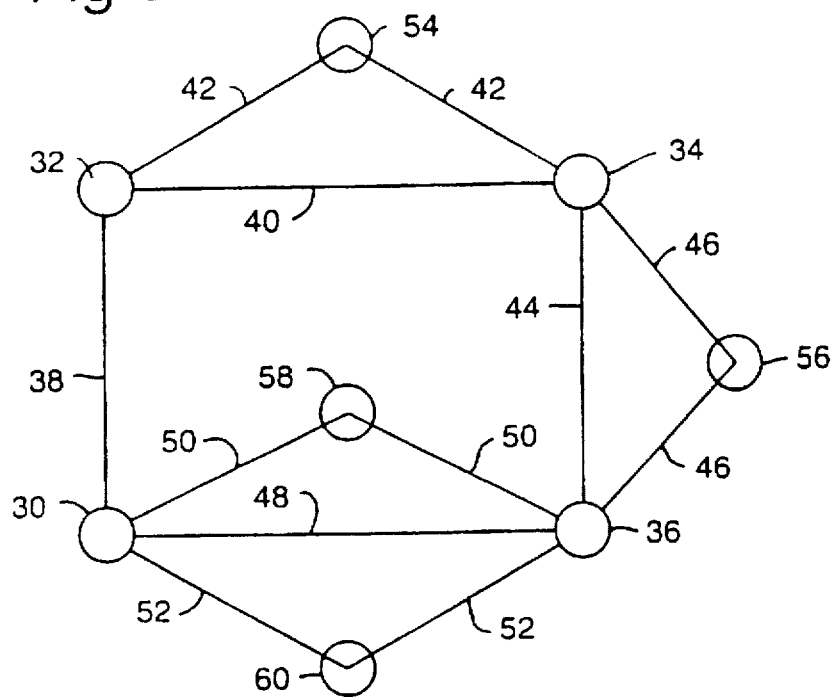
FIG. 3 shows a hypothetical network to illustrate the use of notional intermediate nodes on subspans.

FIG. 3 shows a simple network of four nodes 30, 32, 34 and 36 wherein node 30 is connected to node 32 via a span 38 which has no subspan structure, node 32 is connected to node 34 via two subspans 40 and 42, node 34 is connected to node 36 via two subspans 44 and 46, and node 36 is connected to node 30 via three subspans 48, 50 and 52. A subspan is a group of links which can fail independently of another group of links of a span because, for example, where different subspans run in different ducts taking different physical routes between the nodes, or where two nodes are connected by a satellite link and a submarine cable. In such cases the spare allocation method provides a notional intermediate node for each subspan other than a first subspan whereby the subspans can be treated as individual notional spans. This can be seen in FIG. 2 where subspans 42, 46, 50 and 52 have respective notional intermediate nodes 54, 56, 58 and 60. In this way each subspan is treated as if it is an independent span going to a respective node, for example, subspan 42 can be designated as "span" 42a between nodes 32 and 54, and as "span" 42b between nodes 34 and 54. In alternative methods, each subspan has an associated notional intermediate node.

The above described spare allocation process or method is based on the concept of notionally failing a single span at a time. Where the method is to be used to allocate spare capacity so that restoration routes can be found for multiple subspan failures, then there will be contention for spare capacity. Contention is avoided by prioritising the failed spans. If a restoration strategy involves the use of pre-planned routes, then the routes which are found by this spare allocation method can be used as the actual pre-planned restoration routes. If the restoration strategy involves a distributed route-finding algorithm in real-time, then the restoration will only be successful if the real-time failures are prioritised in the same order as when allocating spare capacity (the network design algorithm).

Where an allocation method is to provide restoration for multiple failures, then step 16 is modified to check that any added restoration route will not itself fail as part of the notional multiple failure event and that a higher priority restoration attempt will not use part of that route for itself.

The above method of spare allocation having the capability of handling multiples failures can be used to design networks which are resilient to node failures by notionally failing all the spans associated with the node at the same time. The method will determine all the network paths which pass through the notionally failed node and will determine whether to allocate spare capacity for end-to-end restoration or just between nodes on the path which are adjacent to the failed node depending on the actual restoration strategy to be employed in the real network.

Figure 4:
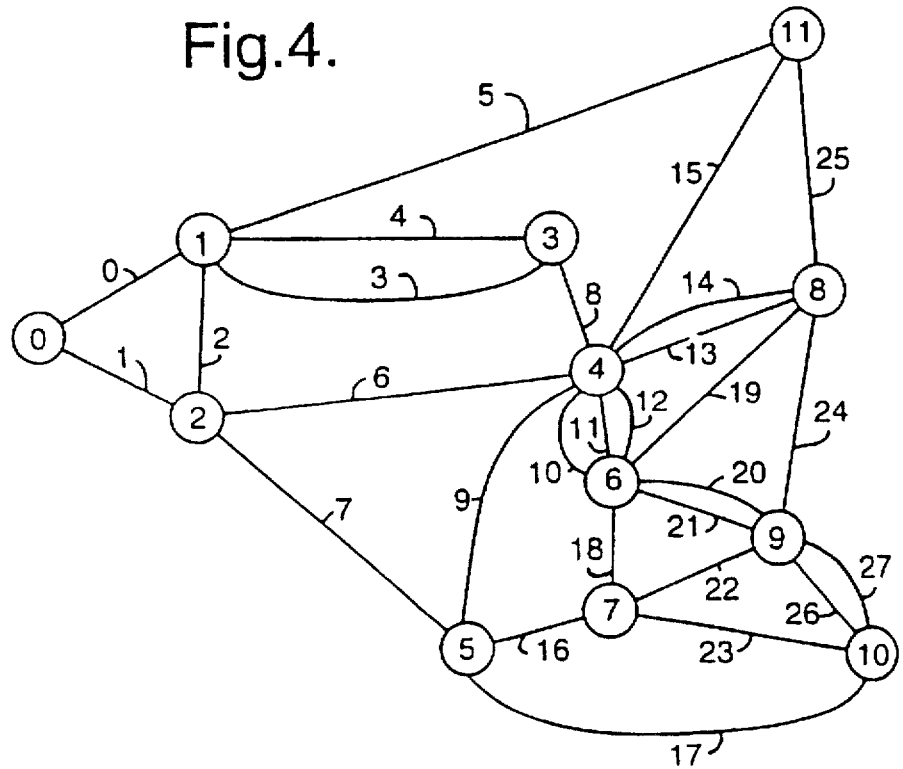
FIG. 4 shows a hypothetical network for which a method of the present invention is to allocate spare capacity.

FIG. 4 shows a hypothetical international network having 12 nodes having network identities from 0 to 11 and 28 subspans, numbered from 0 to 27.

FIG. 5 shows the cost per link in each of the subspans of the network of FIG. 4, the number of workers on each subspan, and also the number of spares allocated by the method of the present invention to each subspan for three different values of maximum restoration path length defined by hops or spans traversed.

If, as an example, there is damage to a cable duct affecting subspans 9 and 10, then the spare capacity for subspan 11 (6), subspan 18 (2), and subspan 16 (3) is sufficient to provide restoration for the subspans 9 and 10. Similarly, restoration is possible if subspans 12 and 19 fail together, or subspans 21 and 22 or subspans 23 and 26.

It can be seen from FIG. 6 that the network of FIG. 4 comprises a fewer number of spares for a hop limit of 5 than for hop limits of 3 or 4, and also has a correspondingly lower network cost. However, it will also be seen that the greater number of hops the longer the run time needed for the method to complete processing, and there will be a corresponding increase in the run time taken by a real-time restoration algorithm in the event that restoration paths of maximum hop have to be found.

In the abovedescribed embodiment the network restorability merit is in the form of the increase in network restorability due to a notionally added spare link divided by the cost of the notionally added spare link. It will be understood that in alternative embodiments the network restorability merit may be in the form of network restorability divided by protection network cost, i.e. the actual restorability value for a notionally added spare divided by the total cost of the protection network (the cost of all the actual spare links of the network together with the cost of the notional spare link). This would be readily achieved by the use of, for example, an accumulator storing the accumulated cost of all actual spare links of the network, and to which is added the cost of each notionally added spare link when it is converted into an actual spare link of the network.

I claim:

1. A method of allocating spare capacity in a communications network comprising a fully or partly meshed arrangement of connected nodes, the method comprising the steps of:

(a) selecting a span of the network;

(b) calculating the network restorability corresponding to the addition of a notional spare link to the selected span;

(c) calculating the corresponding network restorability merit as a function of network restorability value for money;

(d) repeating steps (a), (b) and (c) for other spans, there being no more than one notional spare link added to the network at any one time;

(e) if step (d) produces at least one notional spare link which increases network restorability, choosing the respective notional spare link giving the greatest value of network restorability merit;

(f) designating such chosen notional spare link of the network; and (g) repeating steps (a) to (f) until a desired value of network restorability has been reached, or until step (d) fails to produce a notional spare link which increases network restorability.

2. A method as in claim 1, wherein:

in step (b), multiple-failure network restorability is calculated instead of network restorability, and in step (b) substeps of selecting groups of two or more spans, and for each group ranking the spans of a group in order of priority, notionally failing the spans of a group simultaneously, and resolving any contention for spare capacity by the spans of a group on the basis of their relative priority are included.

3. A method as in claim 2, wherein; if step (d) fails to produce a single notional spare link which increases network restorability, modified steps (a) to (f) are performed in which the selected span and associated notional spare link are replaced by a pair of spans and respective notional spare links;

on each occasion that modified step (f) designates a pair of notional spare links as actual spare links of the network, original steps (a) to (g) are performed; and on each occasion that such a modified step (d) fails to produce a pair of notional spare links which give an increase in network restorability, there are included the steps of (h) randomly choosing a span which is not yet fully restorable, and (i) adding, as actual spare links of the network, a sequence of spare links as a restoration route for the randomly chosen span.

4. A method as in claim 3, including;

before adding the sequence of spare links to the network, the step of checking that each of the sequence of spare links is not associated with one of the plurality of selected spans, whereby the restoration route does not fail in the event that the plurality of spans fail simultaneously.

5. A method as in claim 3 including, before adding the sequence of spare links to the network, the step of checking that each of the sequence of spare links will not form part of a restoration route for a span of higher priority.

6. A method as in claim 2, wherein, for each pair of nodes there is a preferred route of one or more workers, each separate route having a respective identity, and including the steps of:

storing for each node the identities of the routes associated therewith, notionally failing a node by selecting as said group of spans all the spans associated with the notionally failed node, and determining multiple-failure span restorability for the notionally failed node.

7. A method as in claim 1, including the steps of:

(j) notionally removing n spare links and adding m spare links, where n is a positive integer and m is zero or a positive integer, provided that this reduces the cost of the network, (k) calculating the corresponding network restorability, (l) designating each notionally removed spare link and any notionally added spare link as an actually removed spare link and an actually added spare link, respectively, if the network restorability does not fall below the desired value, and repeating steps (j) to (l) until a desired criterion has been reached.

8. A method as in claim 7, wherein n has the same value as m.

9. A method as in claim 1, wherein the network is constituted by a subset of the nodes of a larger communications network.

10. A method as in claim 1, wherein a span comprises a plurality of subspans, and including the step of:

designating a respective notional intermediate node for each subspan other than a first of the plurality of subspans.

11. A method as in claim 1, wherein a span comprises a plurality of subspans, and including the step of:

designating a respective notional intermediate node for each subspan.

\* \* \* \* \*